(12) United States Patent
Vollmer (10) Patent No.: US 10,730,387 B2
(45) Date of Patent: Aug. 4, 2020

(54) DRIVE DEVICE FOR A HYBRID-POWERED MOTOR VEHICLE

(71) Applicant: AUDI AG, Ingolstadt (DE)

(72) Inventor: Frank Vollmer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 331 days.

(21) Appl. No.: 15/523,886

(22) PCT Filed: Nov. 3, 2015

(86) PCT No.: PCT/EP2015/002202
§ 371 (c)(1),
(2) Date: May 2, 2017

(87) PCT Pub. No.: WO2016/070986
PCT Pub. Date: May 12, 2016

(65) Prior Publication Data
US 2018/0304747 A1    Oct. 25, 2018

(30) Foreign Application Priority Data
Nov. 3, 2014 (DE) .......... 10 2014 016 172

(51) Int. Cl.
*B60K 6/48* (2007.10)
*B60K 25/02* (2006.01)
(Continued)

(52) U.S. Cl.
CPC .............. *B60K 25/02* (2013.01); *B60K 6/40* (2013.01); *B60K 6/405* (2013.01); *B60K 6/48* (2013.01);
(Continued)

(58) Field of Classification Search
CPC .... B60K 6/48; B60K 1/02; B60K 2006/4825; B60K 6/38; B60K 6/387; B60K 6/442
See application file for complete search history.

(56) References Cited

U.S. PATENT DOCUMENTS 5,562,565 A * 10/1996 Moroto .................... B60K 6/26
180/65.6
6,258,006 B1 * 7/2001 Hanyu ................... B60K 6/365
475/5
(Continued)

FOREIGN PATENT DOCUMENTS

AT    512 443 A1    8/2013
CN    1672972 A     9/2005
(Continued)

OTHER PUBLICATIONS

English International Search Report dated Jan. 7, 2016 by the European Patent Office in International Application PCT/EP2015/002202.
(Continued)

*Primary Examiner* — Emma K Frick
(74) *Attorney, Agent, or Firm* — Henry M. Feiereisen LLC (57) ABSTRACT

The invention relates to a drive device for a hybrid-powered motor vehicle, comprising an internal combustion engine (11) and at least one electric machine (16) arranged axially parallel to same, which separately or together provide, output to the input shaft (38) of a speed change transmission (14), wherein the electric machine (16) is connected to the force delivery shaft (30) of the internal combustion engine (11) via a torque transmission connection (28) and same is connected in a driving manner to the coaxially aligned transmission input shaft (38) by intermediately connecting at least one coupling (K0). According to the invention, the electric engine (16) is mounted directly onto the internal combustion engine (11) or integrated therein. In addition, the cylinder crankcase (12a) is extended by a housing portion (12b) in which the torque transmission connection (28) is arranged.

12 Claims, 4 Drawing Sheets

(51) Int. Cl.
  *B60K 6/405* (2007.10)
  *B60K 6/40* (2007.10)
  *B60K 25/00* (2006.01)
  *B60K 6/24* (2007.10)
  *B60K 6/26* (2007.10)
  *B60K 6/50* (2007.10)

(52) U.S. Cl.
  CPC  *B60K 6/24* (2013.01); *B60K 6/26* (2013.01); *B60K 6/50* (2013.01); *B60K 2006/4825* (2013.01); *B60K 2025/005* (2013.01); *B60K 2025/022* (2013.01)

(56) References Cited

U.S. PATENT DOCUMENTS

| | | | | |
|---|---|---|---|---|
| 6,455,947 | B1* | 9/2002 | Lilley | B60K 6/365 |
| | | | | 180/65.6 |
| 6,464,028 | B1* | 10/2002 | Imani | B60K 6/26 |
| | | | | 180/65.25 |
| 6,499,370 | B2* | 12/2002 | Bowen | F16H 3/006 |
| | | | | 74/330 |
| 6,656,083 | B2* | 12/2003 | Esaki | B60K 6/40 |
| | | | | 477/5 |
| 6,715,572 | B2* | 4/2004 | Shimabukuro | B60W 20/40 |
| | | | | 180/65.6 |
| 6,719,654 | B2* | 4/2004 | Deichl | B60K 6/40 |
| | | | | 180/65.25 |
| 6,740,002 | B1* | 5/2004 | Stridsberg | B60K 6/405 |
| | | | | 477/14 |
| 6,843,751 | B2* | 1/2005 | Yang | B60K 6/383 |
| | | | | 477/3 |
| 7,114,585 | B2* | 10/2006 | Man | B60K 6/365 |
| | | | | 180/65.21 |
| 7,121,164 | B2* | 10/2006 | Hanyu | B60K 6/387 |
| | | | | 74/661 |
| 7,343,993 | B2* | 3/2008 | Dong | B60K 6/387 |
| | | | | 180/65.23 |
| 7,739,992 | B2* | 6/2010 | Okabe | F02N 3/02 |
| | | | | 123/179.24 |
| 8,622,861 | B2* | 1/2014 | Nett | B60L 50/62 |
| | | | | 475/5 |
| 8,701,808 | B2* | 4/2014 | Zhu | B60K 6/387 |
| | | | | 180/65.6 |
| 9,545,841 | B2* | 1/2017 | Piazza | B60K 6/387 |
| 9,616,883 | B2* | 4/2017 | Nagamine | F16H 61/0031 |
| 9,625,020 | B2 | 4/2017 | Vollmer | |
| 9,649,927 | B2* | 5/2017 | Piazza | B60K 6/50 |
| 9,963,141 | B2* | 5/2018 | Yamamoto | B60K 6/48 |
| 2011/0039649 | A1 | 2/2011 | Tanae et al. | |
| 2012/0014815 | A1 | 1/2012 | Kraxner | |
| 2014/0246935 | A1 | 9/2014 | Kasuya et al. | |
| 2015/0300470 | A1 | 10/2015 | Märkl et al. | |
| 2019/0031180 | A1* | 1/2019 | Lee | B60W 20/19 |

FOREIGN PATENT DOCUMENTS

| | | |
|---|---|---|
| CN | 102358163 A | 2/2012 |
| CN | 102431440 A | 5/2012 |
| CN | 202294235 U | 7/2012 |
| DE | 197 48 423 A1 | 2/1999 |
| DE | 199 41 705 A1 | 3/2000 |
| DE | 199 11 925 A1 | 9/2000 |
| DE | 10 2006 045 937 A1 | 4/2008 |
| DE | 20 2006 019 422 U1 | 5/2008 |
| DE | 10 2009 016 673 A1 | 10/2010 |
| DE | 10 2010 017 760 A1 | 1/2012 |
| DE | 10 2010 045 034 A1 | 3/2012 |
| DE | 11 2012 003 406 T5 | 5/2014 |
| EP | 0 187 027 A2 | 7/1986 |
| EP | 1 321 646 A1 | 6/2003 |
| EP | 1870273 A2 | 12/2007 |
| JP | 2010-52671 | 3/2010 |

OTHER PUBLICATIONS

Chinese Search Report dated Oct. 31, 2018 with respect to counterpart Chinese patent application 2015800593847.

Translation of Chinese Search Report dated Oct. 31, 2018 with respect to counterpart Chinese patent application 2015800593847.

* cited by examiner

DRIVE DEVICE FOR A HYBRID-POWERED MOTOR VEHICLE

CROSS-REFERENCES TO RELATED APPLICATIONS

This application is the U.S. National Stage of International Application No. PCT/EP2015/002202, filed Nov. 3, 2015, which designated the United States and has been published as International Publication No. WO 2016/070986 and which claims the priority of German Patent Application, Serial No. 10 2014 016 172.2, filed Nov. 3, 2014, pursuant to 35 U.S.C. 119(a)-(d).

BACKGROUND OF THE INVENTION

The present invention relates to a drive device for a hybrid-powered motor vehicle.

AT 512 443 A1, for example, discloses a drive device of a generic type, in which a first and, optionally, a second electric machine are arranged axially parallel to an internal combustion engine and in driving relation to the power output shaft of the internal combustion engine via a spur gear mechanism. Couplings are provided on the power output shaft on both sides of the spur gear mechanism for allowing disconnection of the internal combustion engine and/or the electric machines so as to provide a combustion-engine-powered drive, an electric-motor-powered drive, or a hybrid-powered drive. A secondary unit, for example air-conditioning compressor or a coolant pump, can further be operated via the electric machines. As the electric machines are arranged to the side of the internal combustion engine, a drive unit can be created which is relatively short in axial direction; Furthermore, additional degrees of freedom are created by the provided couplings and include, for example: starting of the internal combustion engine, charging operation also at standstill, etc.

DE 20 2006 019 422 U1 describes a further drive device in which an electric machine is mounted to the side of the variable speed transmission and can power the motor vehicle and/or alternatively secondary units, separately or jointly with an internal combustion engine while acting on the transmission input shaft.

SUMMARY OF THE INVENTION

The object of the invention is to propose a drive device of the generic type, which is beneficial in terms of manufacturing, particularly compact in terms of construction, and can be better suited to installation conditions at hand in motor vehicles.

The object is achieved by by a drive device for a hybrid-powered motor vehicle, including an internal combustion engine and at least one electric machine arranged in axis-parallel relationship thereto, which separately or jointly are in driving relation to an input shaft of a variable speed transmission, with the electric machine being connected in driving relation to the power output shaft of the internal combustion engine via a torque transmission connection, and with the power output shaft being connected in driving relation to the coaxially aligned transmission input shaft via at least one clutch, wherein the electric machine is mounted directly to or integrated in the internal combustion engine, and wherein the cylinder crankcase is expanded by a housing portion in which the torque transmission connection is arranged.

Advantageous and particularly useful refinements of the invention are set forth in the dependent claims.

According to the invention, it is proposed that the electric machine is mounted to the internal combustion engine and that the torque transmission connection between the electric machine and the internal combustion engine is arranged within an expanded cylinder crankcase of the internal combustion engine. The torque transmission connection, in particular a chain or a spur gear mechanism, can be integrated into the crankcase in a structurally and spatially beneficial manner and can be connected to the lubricating oil system of the internal combustion engine. Besides a durable construction, this results in a smooth running of the electric machine. The electric machine can preferably be placed instead of an otherwise provided electric starter motor, which can be omitted by the electric machine and its connection to the power output shaft of the internal combustion engine. Furthermore, the torque transmission connection can effect a beneficial speed adjustment between the internal combustion engine (lower speed) and the electric machine (higher speed) in a manner known per se.

According to an advantageous refinement of the invention, the gearwheel (sprocket, spur gear) on the power output shaft is connected in driving relation to a further gearwheel, via which at least one secondary unit of the internal combustion engine can be operated. Thus, the torque transmission connection is expanded to a secondary drive in a structurally simple manner, so that, optionally, an otherwise required belt drive on the internal combustion engine can be omitted.

The gearwheel can, preferably, be rotatably mounted in a housing mounted to the cylinder crankcase and power the secondary unit, in particular an air conditioning compressor of an air conditioning system of the motor vehicle, via an output shaft.

Furthermore, a clutch can be integrated in the power output shaft to allow disconnection of the internal combustion engine from the torque transmission connection or the spur gear mechanism of the electric machine and the transmission input shaft. As a result, in addition to the disconnection of the internal combustion engine, the secondary unit can also be operated purely electrically, for example in a standby mode, when the clutch is open.

As mentioned above, the electric machine can preferably be mounted to the cylinder crankcase of the internal combustion engine at a location where an electric starter motor is otherwise normally positioned. In this case, the electric machine is arranged externally on the internal combustion engine in the transverse direction or radial direction, so that a drive device can be provided which is constructed relatively short in the axial direction. The electric machine can preferably be arranged transversely to the axial direction at least partially in overlapping relation with the internal combustion engine or the crankshaft thereof or arranged transversely in relation to the axial direction in alignment with the internal combustion engine or the crankshaft thereof. In such a construction, the driveshaft of the electric machine can preferably be distanced in the axial direction by an axial offset from the transmission input shaft or from the transmission housing.

The afore-mentioned clutch, by which the internal combustion engine can be disconnected from the torque transmission connection and/or from the transmission input shaft, can preferably be arranged in a separate clutch housing. In this case, the cylinder crankcase, the housing portion (i.e. a transverse drive module housing), the clutch housing, and a transmission housing of the variable speed transmission can be disposed behind one another in the axial direction. In terms of a compact arrangement of the drive components, both the torque transmission connection and a torsional vibration clamper to dampen rotational vibrations of the power output shaft of the internal combustion engine can be arranged in the housing portion (i.e. in the transverse drive module housing).

A structurally particularly compact drive device is established when the housing portion (i.e. the transverse drive module housing) and the electric machine span an inner corner area, while forming an L-shaped structural unit, to enclose an outer corner of the cylinder crankcase of the internal combustion engine.

To further reduce the structural size of the drive device, the clutch housing can also be traversed by a transverse shaft of an axle differential for propelling the vehicle wheels. The clutch can be arranged either anteriorly of or behind the transverse shaft in the vehicle longitudinal direction. The transverse shaft of the axle differential can hereby extend in vehicle vertical direction in offset relation to the transmission input shaft or to the power output shaft.

Preferably, the electric machine can operate not only as a drive unit, but at the same time can also power a secondary unit, for example an air conditioning compressor or a coolant pump. In terms of an arrangement that is space-beneficial, it is preferred when the electric machine is in driving relation to the secondary unit with a driveshaft tap on a side axially opposite to the driveshaft of the electric machine. The secondary unit can be arranged in the vehicle vertical direction below the electric machine in a space-saving manner and mounted to the cylinder crankcase. In this case, the driveshaft tap (which is preferably aligned coaxially with the electric machine driveshaft) can be connected in driving relation to the secondary unit via a gear train, in particular via a chain or belt drive.

According to a further, advantageous configuration of the invention, a second electric machine can be installed on the variable speed transmission in driving relation, directly or indirectly, via a further torque transmission connection to the input shaft of the variable speed transmission. Therefore, it is possible to best suit installation conditions at hand in the motor vehicle, when the electric machines operate at high overall driving performance, while the two electric machines have beneficial dimensions and, optionally, weight can be distributed in the motor vehicle in a desired manner. In addition, the electric machines can also be activated individually, when the driving demands are lower, while a second electric machine is connected, for example, as a generator.

The torque transmission connection can again be configured as a spur gear mechanism, with a gearwheel on the driveshaft of the electric machine and a larger gearwheel on the transmission input shaft of the variable speed transmission. As an alternative, a toothed belt drive could also be used here.

The electric machine can further act on the torque transmission connection or on the spur gear mechanism via a planetary gear train with one or more transmission stages in order to optionally still better suit required transmission ratios and vehicle speeds of the motor vehicle.

The torque transmission connection or the spur gear mechanism of the second electric machine is particularly preferably arranged in the force flow downstream of the clutch disconnecting the internal combustion engine and upstream of at least one separating clutch on the input shaft of the variable speed transmission.

Furthermore, the clutch disconnecting the internal combustion engine can be in a constructively simple manner a form-fitting shift clutch which can be switched via the first electric machine after synchronization of its clutch elements and connects, for example, the internal combustion engine. As an alternative, the clutch can, however, also be configured as a friction clutch or hydraulically actuated disc clutch.

Finally, as an alternative or in addition, the second electric machine can power with its driveshaft at least a secondary unit of the motor vehicle, in particular an air conditioning compressor, a hydraulic pump, etc.

BRIEF DESCRIPTION OF THE DRAWING

Two exemplary embodiments of the invention are explained in more detail with reference to the accompanying schematic drawing. It is shown in.

DETAILED DESCRIPTION OF PREFERRED EMBODIMENTS

Figure 1:
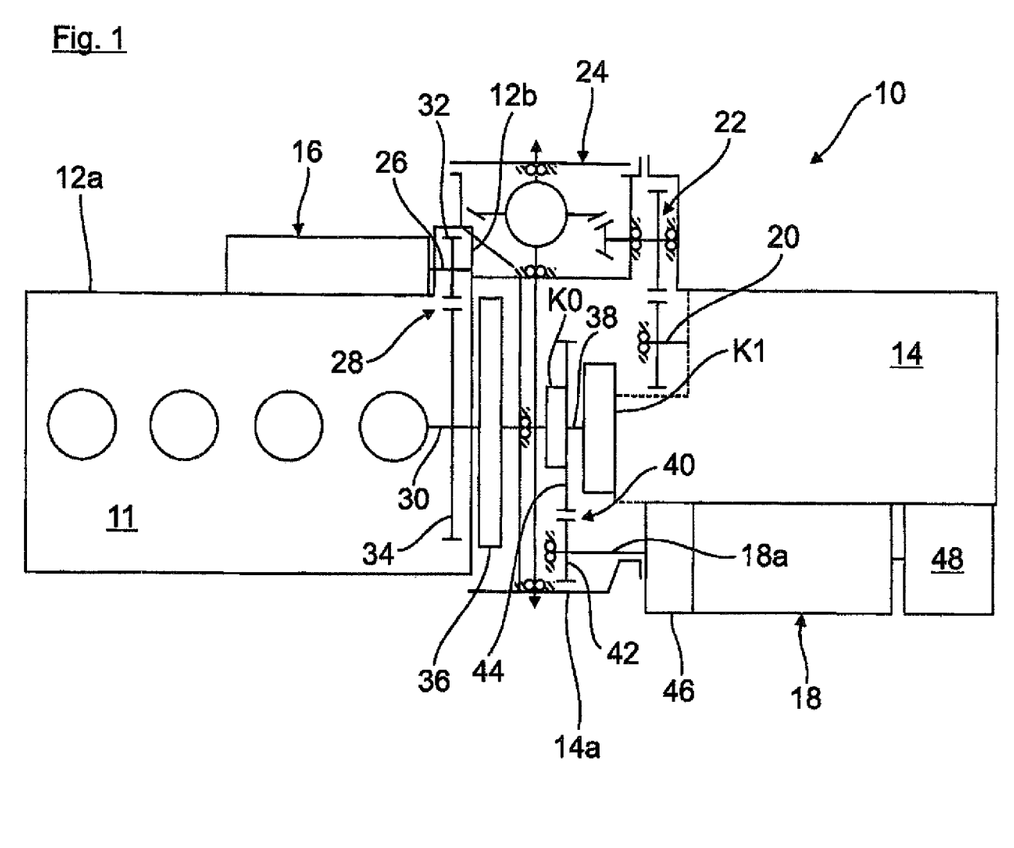
FIG. 1 a drive device for hybrid-powered motor vehicles with an internal combustion engine and two electric machines which are in driving relation to a variable speed transmission, with the electric machines each in driving relation via a spur gear mechanism to the power output shaft of the internal combustion engine on one hand and to the transmission input shaft of the variable speed transmission on the other hand.

FIG. 1 shows a simple block diagram of a drive unit 10 for a hybrid-powered motor vehicle, including a multi-cylinder internal combustion engine 11, a downstream variable speed transmission 14, and two electric machines 16, 18. The variable speed transmission 14 drives an integrated axle differential 24 via an output shaft 20 and an intermediate gear system 22 for propelling the wheels of the motor vehicle.

The electric machine 16 is mounted to the side of the cylinder crankcase 12a of the internal combustion engine 11 or integrated (optionally to replace an otherwise conventional starter motor) and is in driving relation via a driveshaft 26 and a torque transmission connection, preferably a spur gear mechanism 28, on the output side to the power output shaft or crankshaft 30 of the internal combustion engine 11.

The spur gear mechanism 28 having a smaller gearwheel 32 on the driveshaft 26 and a larger gearwheel 34 on the crankshaft 30 is arranged within the cylinder crankcase 12a, wherein the radially outer gearwheel 32, as is apparent, can be arranged in a laterally projecting housing portion 12b (i.e. transverse drive module housing) of the cylinder crankcase and can be connected, inter alia, to the lubricating oil system of the internal combustion engine 11 (not shown).

The electric machine 16 is lastingly (i.e. in permanent connection) connected in driving relation to the crankshaft 30 and can thus be operated as starter motor, as additional drive motor, or as generator to supply the on-board electrical system of the motor vehicle or a traction battery with electricity.

The power output shaft or crankshaft 30 can be connected in driving relation to the transmission input shaft 38 of the variable speed transmission 14 in a vehicle longitudinal direction x or in the torque flow direction with interposition of a torsional vibration damper 36 (for example a two-mass flywheel) and a clutch K0. The clutch K0 can be configured with friction fit, for example a hydraulically actuated disc clutch, preferably however as formfittingly acting shift clutch (claw clutch).

The internal combustion engine 11 can be disconnected from the drive train or from the variable speed mechanism 14 via the clutch K0. When the internal combustion engine 11 is connected, the clutch elements of the shift clutch K0 can be synchronized in synchronism, in particular when clutch K1 is open, through corresponding operation of the electric machine 16.

The second electric machine 18 is mounted to the side of the variable speed transmission 14, which on the driving side, optionally in the presence of a planetary gear train 46 (only indicated) and via a spur gear mechanism 40 as torque transmission connection, is in driving relation to the transmission input shaft 38 in torque flow direction downstream of the clutch K0 but upstream of a frictional separating clutch K1. The spur gear mechanism 40 is hereby positioned within a clutch housing 14a of the variable speed transmission 14.

Instead of the spur gear mechanism 40 with the gearwheels 42, 44, the use of a toothed belt drive or a chain is possible. In the case of an automatically switched variable speed transmission 14 (for example a dual clutch transmission known per se), the separating clutch K1 can be formed by the disc clutches which are integrated in the transmission 14 and activate the gears.

The driveshaft 18a of the electric motor 18 drives, on one hand, the spur gear mechanism 40 and, on the other hand, a secondary unit, here an air conditioning compressor 48 of an air conditioning system of the motor vehicle.

As a result of the described drive device 10 according to FIG. 1, the motor vehicle can travel forwards or back up purely electrically by the preferably more powerful electric machine 18, when the clutch K0 is open and the clutch K1 is closed. The planetary gear train 46 can hereby be configured with multiple gears, for example to be only torque-increasing or to suit the travel speed.

In addition, the electric machine 18 can also power the air conditioning compressor 48 (or another secondary unit), even when the clutch K1 is open (at standstill).

The internal combustion engine 11 can be started via the electric machine 16, when the clutch K0 is open. During the course of further operation, the electric machine 16 can then operate as generator so as to produce electricity, jointly rotate in neutral, or operate as motor to supply drive energy in addition to the internal combustion engine 11.

The same applies to the second electric machine 18 which, when the internal combustion engine 11 or drive device 10 is in operation, is able to jointly rotate in neutral, to additionally supply drive energy (boost mode), or is able to operate as generator.

Furthermore, both electric machines 16, 18, or the electric machine 18 when the clutch K0 is open, can be used in the recuperation mode for energy recovery in the braking operation of the motor vehicle.

Figure 2:
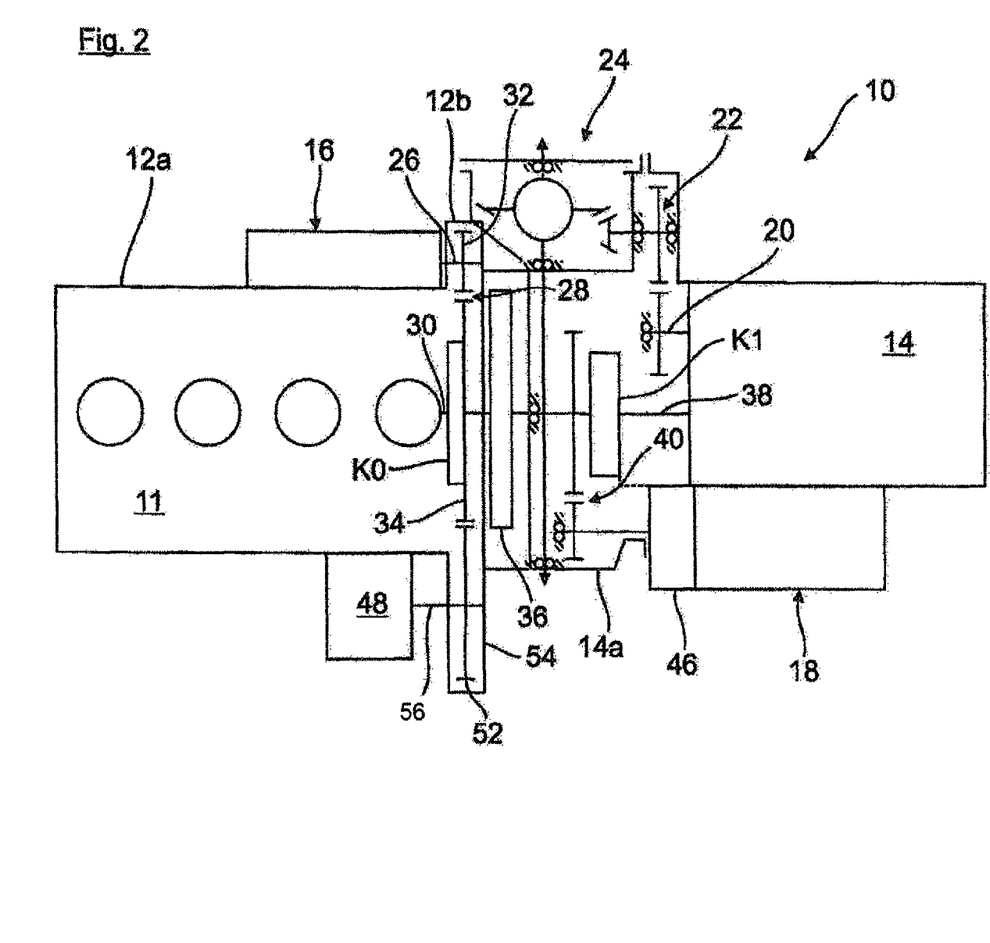
FIG. 2 a drive device according to FIG. 1, in which the spur gear mechanism on the power output shaft is expanded in addition to a drive for secondary units of the internal combustion engine, and the power output shaft (crankshaft) can be decoupled from the spur gear mechanism.

FIG. 2 shows a further exemplary embodiment of a drive device 10 which is described only insofar as it differs substantially from FIG. 1. Functionally same parts are given the same reference numerals.

According to FIG. 2, the spur gear mechanism 28 is expanded between the electric machine 16 and the crankshaft 30 of the internal combustion engine 11 by a further gearwheel 52, which meshes with the gearwheel 34 and serves as secondary output.

The gearwheel 52 rotatably supported in a housing 54 that is mounted to the cylinder crankcase 12a drives directly or via an output shaft 56 a secondary unit, which can be in particular an air conditioning compressor 48 of an air conditioning system of the motor vehicle. However, this does not rule out the possibility that the electric machine 18 can also, optionally, power a secondary unit as described above.

Furthermore, the afore-described clutch K0 is now provided, as opposed to FIG. 1, in the torque flow direction anteriorly of the spur gear mechanism 28. The clutch K0 is thus arranged on the crankshaft 30 in such a way that the internal combustion engine 11 can be disconnected from the spur gear mechanism 28 and the further drive train via the clutch K0. The clutch K0 is here preferably a friction clutch, in particular a hydraulically actuated disc clutch.

Accordingly, when the clutch K0 is open, the motor vehicle can be powered purely electromotively via both electric machines 16, 18. When the clutch K1 is also opened, the secondary unit 48 can also be operated at standstill, optionally even via both electric machines.

The invention is not limited to the described embodiments. In particular, modifications or combinations of both drawing figures common to the person skilled in the art are possible.

Figure 3:
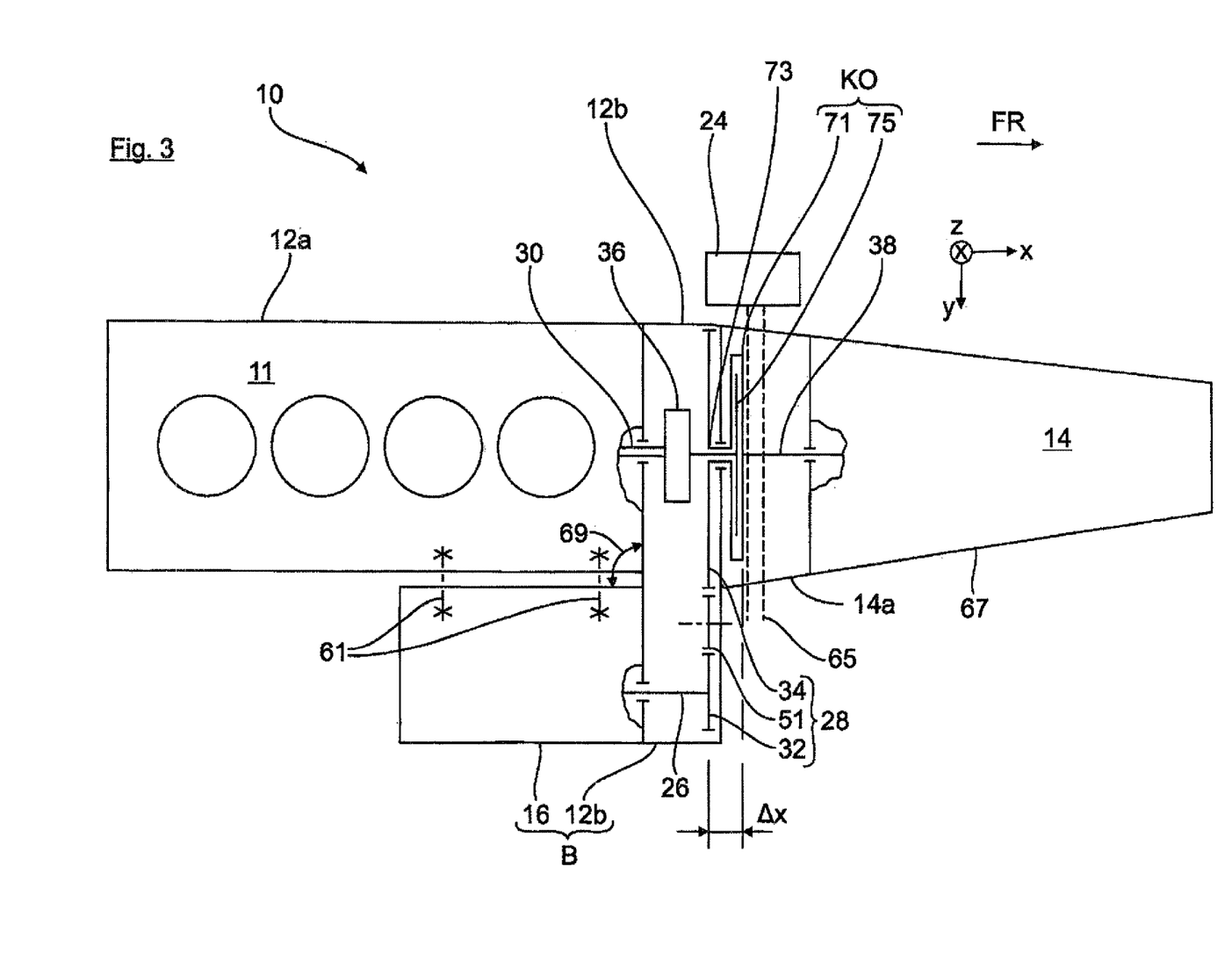
FIGS. 3 and 4 further exemplary embodiments of the invention, each by way of views corresponding to FIG. 2.

FIG. 3 shows a further exemplary embodiment having a basic structure which corresponds to that in FIG. 2, but with the exception that no second electric machine 18 is provided in FIG. 3. In correspondence with FIG. 2, the clutch K0 is arranged also in FIG. 3 in the torque flow direction upstream of the torque transmission connection 28. As in the preceding figures, the electric machine 16 is laterally secured to the cylinder crank housing 12a of the internal combustion engine 11 via hinted flanged connections 61. Consequently, the electric machine 16 is overlapped or arranged in alignment with the internal combustion engine 11 (i.e. with its crankshaft 30) in the vehicle transverse direction y (i.e. transversely to the axial direction x). The driveshaft 26 of the electric machine 16 is distanced in the axial direction or vehicle longitudinal direction x by an axial offset $\Delta x$ (FIG. 3 or 4) from the transmission input shaft 38. In other words, the electric machine 16 is arranged axis-parallel to the internal combustion engine 11. In particular, the electric machine 16 and the internal combustion engine 11 are spaced apart from each other in the radial direction of the crankshaft 30, while the electric machine 16 has at least partially an overlapping region with the internal combustion engine 11 or crankshaft 30 thereof. The internal combustion engine 11 and the electric machine 16 are therefore approximately at a same level in the vehicle longitudinal direction x.

The clutch K0 is arranged in FIG. 3 in the clutch housing 14a, which is traversed by a transverse shaft 65 of the axle differential 24 for propelling the vehicle wheels. In FIG. 3, the clutch K0 is positioned in the travel direction FR, i.e. in the vehicle longitudinal direction x forwards, behind the transverse shaft 65 in the clutch housing 14a. The transverse shaft 65 extends in the vehicle direction z below the transmission input shaft 38.

As is further apparent in FIG. 3, both the torsional vibration damper 36 and the torque transmission connection 28 are positioned in the housing portion 12b (i.e. the transverse drive module housing). Overall, the crankcase housing 12a, the housing portion 12b, the clutch housing 14a, and a transmission housing 67 of the variable speed transmission 14 are arranged behind one another in the axial direction or in the vehicle longitudinal direction x.

In terms of a structurally compact drive device, the housing portion 12b (i.e. the transverse drive module housing) and the electric machine 16 form an L-shaped structural unit B (FIG. 3 or 4) which spans an inner corner area 69 (FIG. 3 or 4) where the cylinder crankcase 12a of the internal combustion engine 11 is arranged.

Figure 4:
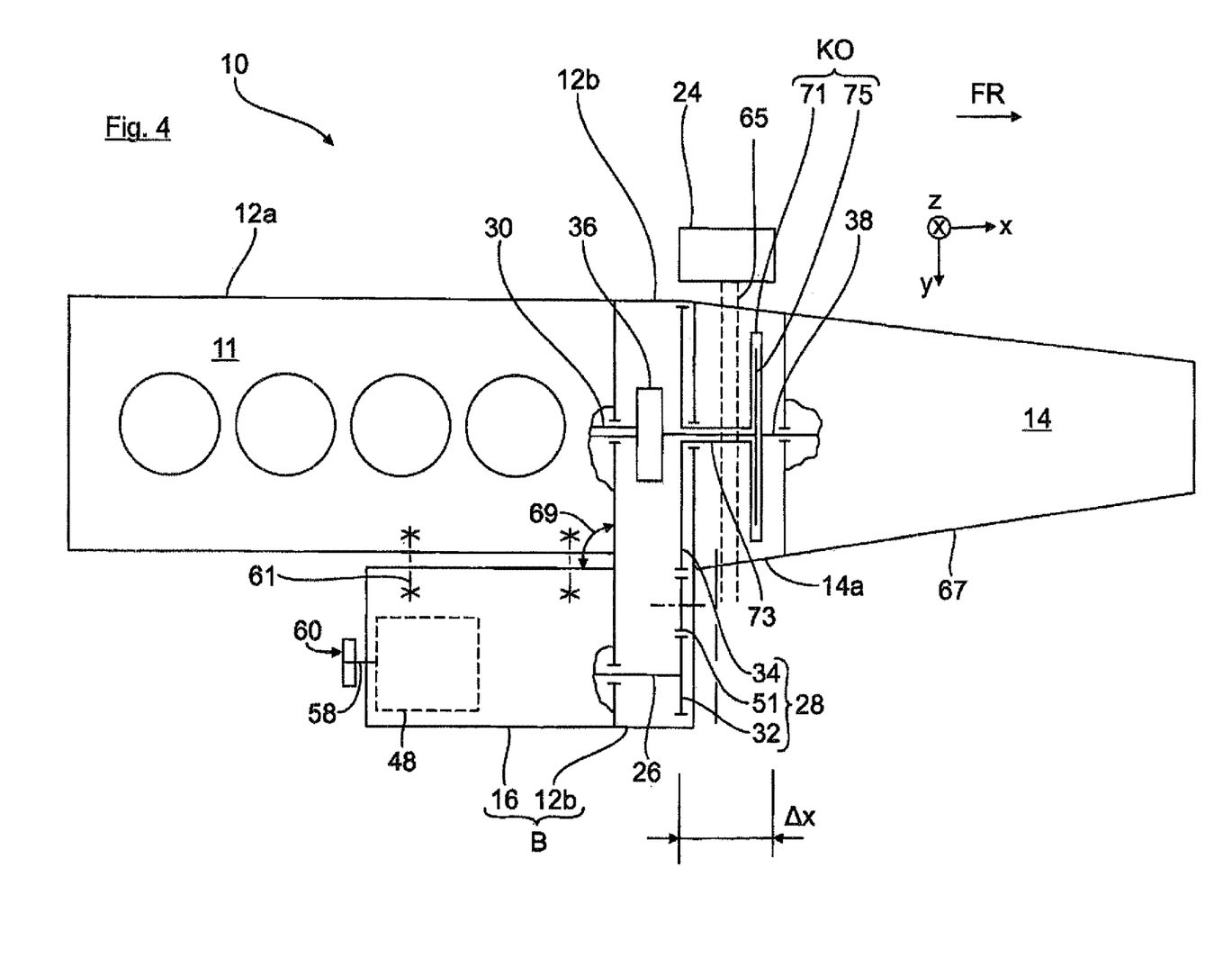

FIG. 4 shows a refinement of the exemplary embodiment shown in FIG. 3 and basically identical to FIG. 3. In contrast to FIG. 3, the clutch K0 is positioned in the vehicle longitudinal direction x forwards, i.e. in the travel direction FR, anteriorly of the transverse shaft 65 in the clutch housing 14a. An outer disc carrier 71 of the clutch K0 and the gearwheel 34 are hereby positioned in fixed rotative engagement on a hollow shaft 73 which extends between the housing portion 12b and the clutch housing 14a. The power output shaft 30 extends in the hollow shaft 73 coaxially up to an inner disc carrier 75 of the clutch K0, which inner disc carrier cooperates with the outer disc carrier 71 of the hollow shaft 73.

As is further apparent in FIG. 4, the electric machine 16 has on its side that is axially opposite to the electric machine driveshaft 26 a driveshaft tap 58 by which a secondary unit 48, in particular an air conditioning compressor, can be powered. The secondary unit 48 is positioned in the vehicle direction z directly on the internal combustion engine 11 below the electric machine 16, i.e. in a not shown inner corner region between the electric machine 16 and the cylinder crankcase 12a. The electric machine 16 is in driving relation to the secondary unit 48 via the driveshaft tap 58 and a belt drive 60. As an alternative, the provision of a drive of the secondary unit 48 is also possible via a gearwheel from the housing portion 12b (i.e. the transverse drive module housing).

What is claimed is:

1. A drive device for a hybrid-powered motor vehicle, comprising:
   a variable speed transmission including an input shaft;
   an internal combustion engine including a power output shaft extending in coaxial relation to the input shaft of the variable speed transmission, said internal combustion engine including a cylinder crankcase and a housing portion formed on the cylinder crankcase to expand the cylinder crankcase;
   a first electric machine mounted directly to or integrated in the internal combustion engine in axis-parallel relationship thereto, the first electric machine and the internal combustion engine separately or jointly being in driving relation to the input shaft of the variable speed transmission;
   a first torque transmission connection via which the first electric machine is connected in driving relation to the power output shaft of the internal combustion engine, said first torque transmission connection being arranged in the housing portion of the cylinder crankcase;
   a clutch via which the power output shaft is in driving relation to the input shaft;
   a second electric machine mounted directly on the variable speed transmission;
   a second torque transmission connection, said second electric machine being in driving relation to the input shaft of the variable speed transmission indirectly or directly via the second torque transmission connection; and
   a separating clutch on the input shaft of the variable speed transmission, said second torque transmission connection being arranged in a torque flow direction downstream of the clutch and upstream of the separating clutch,
   wherein the first electric machine includes a driveshaft, said first torque transmission connection formed by a spur gear mechanism having a gearwheel on the driveshaft of the first electric machine and a gearwheel on the power output shaft of the internal combustion engine.

2. The drive device of claim 1, wherein the gearwheel on the power output shaft of the internal combustion engine is sized larger than the gearwheel on the driveshaft of the first electric machine.

3. The drive device of claim 1, wherein the first torque transmission connection is formed by the spur gear mechanism having the gearwheel on the Dower output shaft also arranged in fixed rotative engagement on the input shaft of the variable speed transmission.

4. The drive device of claim 1, wherein the clutch is integrated on the power output shaft.

5. The drive device of claim 1, wherein the first electric machine is arranged at least partly in the cylinder crankcase or on an outside of the cylinder crankcase in driving relation to the power output shaft of the internal combustion engine.

6. The drive device of claim 1, wherein the second electric machine includes a driveshaft, said second torque transmission connection being configured as spur gear mechanism having a gearwheel on the driveshaft of the second electric machine and a gearwheel on the transmission input shaft of the variable speed transmission.

7. The drive device of claim 6, wherein the gearwheel on the transmission input shaft of the variable speed transmission is sized larger than the gearwheel on the driveshaft of the second electric machine.

8. The drive device of claim 1, wherein the second electric machine acts on the second torque transmission connection via a planetary gear train with one or more gear stages.

9. The drive device of claim 1, wherein the second electric machine includes a driveshaft to power an air conditioning compressor.

10. A drive device for a hybrid-powered motor vehicle, comprising:
    a variable speed transmission including an input shaft;
    an internal combustion engine including a power output shaft extending in coaxial relation to the input shaft of the variable speed transmission, said internal combustion engine including a cylinder crankcase and a housing portion formed on the cylinder crankcase to expand the cylinder crankcase;
    a first electric machine mounted directly to or integrated in the internal combustion engine in axis-parallel relationship thereto, the first electric machine and the internal combustion engine separately or jointly being in driving relation to the input shaft of the variable speed transmission;
    a first torque transmission connection via which the first electric machine is connected in driving relation to the power output shaft of the internal combustion engine, said first torque transmission connection being arranged in the housing portion of the cylinder crankcase;
    a clutch via which the power output shaft is in driving relation to the input shaft;
    a second electric machine mounted directly on the variable speed transmission;

a second torque transmission connection, said second electric machine being in driving relation to the input shaft of the variable speed transmission indirectly or directly via the second torque transmission connection; and a separating clutch on the input shaft of the variable speed transmission, said second torque transmission connection being arranged in a torque flow direction downstream of the clutch and upstream of the separating clutch, wherein the first torque transmission connection is formed by a spur gear mechanism having a gearwheel arranged in fixed rotative engagement on the input shaft of the variable speed transmission.

11. A drive device for a hybrid-powered motor vehicle, comprising:

a variable speed transmission including an input shaft;

an internal combustion engine including a power output shaft extending in coaxial relation to the input shaft of the variable speed transmission, said internal combustion engine including a cylinder crankcase and a housing portion formed on the cylinder crankcase to expand the cylinder crankcase;

a first electric machine mounted directly to or integrated in the internal combustion engine in axis-parallel relationship thereto, the first electric machine and the internal combustion engine separately or jointly being in driving relation to the input shaft of the variable speed transmission;

a first torque transmission connection via which the first electric machine is connected in driving relation to the power output shaft of the internal combustion engine, said first torque transmission connection being arranged in the housing portion of the cylinder crankcase;

a clutch via which the power output shaft is in driving relation to the input shaft;

a second electric machine mounted directly on the variable speed transmission;

a second torque transmission connection, said second electric machine being in driving relation to the input shaft of the variable speed transmission indirectly or directly via the second torque transmission connection; and a separating clutch on the input shaft of the variable speed transmission, said second torque transmission connection being arranged in a torque flow direction downstream of the clutch and upstream of the separating clutch, wherein the clutch is integrated on the power output shaft.

12. A drive device for a hybrid-powered motor vehicle, comprising:

a variable speed transmission including an input shaft;

an internal combustion engine including a power output shaft extending in coaxial relation to the input shaft of the variable speed transmission, said internal combustion engine including a cylinder crankcase and a housing portion formed on the cylinder crankcase to expand the cylinder crankcase;

a first electric machine mounted directly to or integrated in the internal combustion engine in axis-parallel relationship thereto, the first electric machine and the internal combustion engine separately or jointly being in driving relation to the input shaft of the variable speed transmission;

a first torque transmission connection via which the first electric machine is connected in driving relation to the power output shaft of the internal combustion engine, said first torque transmission connection being arranged in the housing portion of the cylinder crankcase;

a clutch via which the power output shaft is in driving relation to the input shaft;

a second electric machine mounted directly on the variable speed transmission;

a second torque transmission connection, said second electric machine being in driving relation to the input shaft of the variable speed transmission indirectly or directly via the second torque transmission connection; and a separating clutch on the input shaft of the variable speed transmission, said second torque transmission connection being arranged in a torque flow direction downstream of the clutch and upstream of the separating clutch, wherein the first electric machine is arranged at least partly in the cylinder crankcase or on an outside of the cylinder crankcase in driving relation to the power output shaft of the internal combustion engine.

* * * * *

UNITED STATES PATENT AND TRADEMARK OFFICE
CERTIFICATE OF CORRECTION

PATENT NO.        : 10,730,387 B2                                   Page 1 of 1
APPLICATION NO.   : 15/523886
DATED             : August 4, 2020
INVENTOR(S)       : Frank Vollmer It is certified that error appears in the above-identified patent and that said Letters Patent is hereby corrected as shown below:

In the Claims

In Column 8, Claim 3, Line 18 replace "Dower" with --power--.

Signed and Sealed this
Twelfth Day of January, 2021

Andrei Iancu
*Director of the United States Patent and Trademark Office*